US009822724B2

(12) United States Patent
Schweinfurth et al.

(10) Patent No.: US 9,822,724 B2
(45) Date of Patent: Nov. 21, 2017

(54) METHOD AND CONTROL UNIT FOR CALIBRATING A DRIVE OF A THROTTLE VALVE OF AN INTERNAL COMBUSTION ENGINE IN A MOTOR VEHICLE

(71) Applicant: Robert Bosch GmbH, Stuttgart (DE)

(72) Inventors: Reiner Schweinfurth, Eppingen (DE); Simon Dierolf, Kirchheim/Teck (DE); Udo Sieber, Bietigheim (DE); Dieter Schwarzmann, Heilbronn (DE); Andreas Ortseifen, Eschweiler (DE); Tobias Mauk, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 84 days.

(21) Appl. No.: 14/890,531

(22) PCT Filed: Mar. 26, 2014

(86) PCT No.: PCT/EP2014/056054
§ 371 (c)(1),
(2) Date: Nov. 11, 2015

(87) PCT Pub. No.: WO2014/187593
PCT Pub. Date: Nov. 27, 2014

(65) Prior Publication Data

US 2016/0102627 A1 Apr. 14, 2016

(30) Foreign Application Priority Data

May 23, 2013 (DE) ........................ 10 2013 209 624

(51) Int. Cl.
*G06F 19/00* (2011.01)
*F02D 41/24* (2006.01)
(Continued)

(52) U.S. Cl.
CPC ........... *F02D 41/2432* (2013.01); *F02D 9/08* (2013.01); *F02D 11/105* (2013.01);
(Continued)

(58) Field of Classification Search
CPC ........... F02D 19/0623; F02D 2041/227; F02D 41/22; F02D 2011/102; F02D 9/105
(Continued)

(56) References Cited

U.S. PATENT DOCUMENTS 4,197,822 A * 4/1980 Tsiang .................... F02D 35/00
123/684
4,224,908 A * 9/1980 Bier .................... F02D 35/0053
123/437
(Continued)

FOREIGN PATENT DOCUMENTS

DE 100 46 269 A1 12/2001
DE 10 2006 035 372 A1 5/2007
(Continued)

OTHER PUBLICATIONS

International Search Report corresponding to PCT Application No. PCT/EP2014/056054, dated Jul. 3, 2014 (German and English language document) (7 pages).

*Primary Examiner* — John Kwon
(74) *Attorney, Agent, or Firm* — Maginot, Moore & Beck LLP

(57) ABSTRACT

A method for calibrating a drive of a throttle valve of an internal combustion engine of a motor vehicle includes detecting whether the internal combustion engine is currently running or is not running. The method further includes activating the drive to displace the throttle valve into a target position if it is detected that the internal combustion engine is currently not running. The method further includes calibrating a characteristic at the target position. A correlation
(Continued)

between a rotor position of the drive and an output voltage of a throttle valve angle transducer follows a characteristic.

10 Claims, 1 Drawing Sheet

(51) Int. Cl.

| | |
|---|---|
| ***F02D 11/10*** | (2006.01) |
| ***F02D 9/08*** | (2006.01) |
| ***F02D 41/04*** | (2006.01) |
| ***F02D 41/26*** | (2006.01) |

(52) U.S. Cl.
CPC .......... *F02D 11/106* (2013.01); *F02D 41/045* (2013.01); *F02D 41/2438* (2013.01); *F02D 41/2464* (2013.01); *F02D 41/2474* (2013.01); *F02D 41/26* (2013.01); *F02D 2011/102* (2013.01); *F02D 2200/0404* (2013.01); *F02D 2250/16* (2013.01)

(58) Field of Classification Search
USPC ......... 701/101, 103–105, 114, 115; 123/399, 123/361; 318/400.01, 400.37, 560, 671, 318/520, 554
See application file for complete search history.

(56) References Cited

U.S. PATENT DOCUMENTS

| | | | | | |
|---|---|---|---|---|---|
| 4,505,169 | A * | 3/1985 | Ganoung | B60W 30/18 477/100 |
| 4,656,407 | A * | 4/1987 | Burney | B60K 31/042 123/352 |
| 2010/0275879 | A1 | 11/2010 | Garon et al. | |

FOREIGN PATENT DOCUMENTS

| | | | |
|---|---|---|---|
| DE | 10 2007 003 151 | A1 | 7/2008 |
| DE | 10 2010 063 326 | A1 | 12/2011 |
| DE | 10 2011 005 774 | A1 | 9/2012 |
| JP | 61-8433 | A | 1/1986 |
| JP | 61-8434 | A | 1/1986 |
| JP | 2001-329867 | A | 11/2001 |
| JP | 2007-120405 | A | 5/2007 |
| WO | 2008/090099 | A1 | 7/2008 |

* cited by examiner

METHOD AND CONTROL UNIT FOR CALIBRATING A DRIVE OF A THROTTLE VALVE OF AN INTERNAL COMBUSTION ENGINE IN A MOTOR VEHICLE

This application is a 35 U.S.C. §371 National Stage Application of PCT/EP2014/056054, filed on Mar. 26, 2014, which claims the benefit of priority to Serial No. DE 10 2013 209 624.0, filed on May 23, 2013 in Germany, the disclosures of which are incorporated herein by reference in their entirety.

The present disclosure concerns a method for calibrating a drive of a throttle valve of an internal combustion engine in a motor vehicle as well as a control unit that is configured to carry out such a method and a motor vehicle with such a control unit.

BACKGROUND

In a motor vehicle with an internal combustion engine a throttle valve is generally used to regulate a quantity of air delivered to the internal combustion engine. In order to suitably position the throttle valve, for example in the induction pipe of the internal combustion engine, the position of the throttle valve can be adjusted using a suitable drive. Hitherto mainly electric motors, for example in the form of direct current motors with brushes, have been used as possible drives.

For example, because of their better efficiency or their smaller size, so-called brushless direct current motors (BLDC motors) should be used in electrical throttle flap adjusting units in the future. Such motors are sometimes also referred to as electrically commutated electrical machines. The actuation means for such a BLDC motor should generally be arranged such that the motor is operated with optimum efficiency wherever possible. The actuation means can however respond very sensitively for example to parameter fluctuations and angular errors between a rotor and a stator of the motor. In this case an angular error is a deviation between an actual rotor position and a rotor position assumed by the control software.

For precise actuation of a BLDC motor it therefore appeared necessary hitherto to determine the current position of the rotor very accurately, for example using an angle transducer. Alternatively, the rotor position can be determined by means of a current-based angle detection. With current-based angle detection, the position of the rotor is calculated or estimated from the measured currents using an algorithm based on a motor model. Such current-based angle detection can sometimes be achieved because current regulation is often provided as a secondary control loop for revolution rate or torque regulation of the BLDC motor. Current regulation requires a current sensing means for detecting the actual current values.

For cost reduction, neither a current sensing means, and thus also no current regulation, should be provided in future throttle flap adjusting units nor should an additional angle transducer be disposed on the motor shaft. Instead the current position of the rotor should be detected indirectly using an already present throttle valve angle transducer that is provided to measure the current angular position of the throttle valve and that is for example connected to the shaft of the BLDC motor by means of a gearbox.

A generally non-linear relationship between a rotor position and an output voltage of the throttle valve angle transducer can for example be represented as a characteristic. Said characteristic is initially unknown and can for example be determined before the actual setting to work of the electrical throttle flap adjusting unit. For example, the characteristic can be determined automatically by a software-controlled process, which is also referred to as basic adaptation. One such possible process is described in DE 10 2009 063 326 A1. A result of the basic adaptation, i.e. the characteristic, can then be stored in a control unit (ECU) and subsequently used for the actuation of the BLDC-motor.

However, the relationship between the rotor position and the output voltage of the throttle valve angle transducer that was originally determined and stored as a characteristic can for example be changed during a subsequent operation by external influences, in particular by temperature fluctuations, and over the operating life, in particular by wear and tear. The originally adopted characteristic can then deviate from the currently prevailing relationship between the rotor position and the output voltage of the throttle valve angle transducer, so that the actuation of the BLDC motor can be erroneous.

SUMMARY

Using embodiments of the present disclosure, a method as well as a control unit for a motor vehicle implementing such a method can be provided, with which the aforementioned characteristic can be corrected during the operation of the motor vehicle and thus the drive of the throttle valve can be calibrated.

According to one aspect of the present disclosure, a method for calibrating a drive of a throttle valve of an internal combustion engine in a motor vehicle is proposed. A correlation between a rotor position of the drive and an output voltage of a throttle valve angle transducer follows a characteristic during this. The method is characterized by the following steps: it is first detected whether the internal combustion engine is currently running or not running If it is detected that the internal combustion engine is currently not running, the drive of the throttle valve is activated to displace the throttle valve into a target position. In other words, the electric motor driving the throttle valve is specifically energized during the period when the internal combustion engine is not running such that the throttle valve is displaced into a target position. In this case the target position preferably differs from a rest position of the throttle valve, which means for example a fully closed position of the throttle valve. For example, the throttle valve can be displaced into a substantially opened or fully opened position. The characteristic is then calibrated at said target position.

One idea here is that a correction or a calibration of the characteristic has hitherto been carried out exclusively with the internal combustion engine running. In order for example to be able to detect and compensate deviations between an originally adopted characteristic and a currently prevailing correlation between the rotor position of the drive and the output voltage of the throttle valve angle transducer, suitable adaptation processes can be carried out at positions at which the throttle valve is displaced during the operation of the vehicle according to current driver demands in order to calibrate the characteristic at least at said throttle valve positions. One such possible method is disclosed in DE 10 2011 005 774 A1 and is sometimes referred to as the “pendulum method”.

Such a procedure can however suffer from the fact that certain throttle valve positions typically occur more frequently than other throttle valve positions during the operation of the motor vehicle. A frequency of the throttle valve positions can depend here for example on the current traffic situation and/or the driving profile. In certain regions, for example close to a fully opened position, the throttle valve typically only stops very rarely and only for brief periods of time. Said periods of time do not generally suffice for performance of a correction process. Consequently, a segment of the characteristic characterizing said regions cannot be investigated for such deviations and thus also cannot be adapted to the current situation for full calibration of the entire characteristic.

Said shortcoming, that the characteristic cannot generally be corrected in all its regions for a calibration, can be eliminated with the calibration method proposed herein by not performing a calibration of the characteristic or at least not only performing a calibration of the characteristic if the internal combustion engine of the motor vehicle is running.

Instead it is provided to continuously monitor the operating state of the internal combustion engine in order to detect whether the engine is currently running or not running. Whereas when the internal combustion engine is running there should be no arbitrary intervention into the positioning of the throttle valve in order to avoid adversely affecting the fuel-air mixture delivered to the internal combustion engine, with the internal combustion engine not running the throttle valve can be driven to any positions without jeopardizing the operation of the internal combustion engine. In particular, with the internal combustion engine not running the throttle valve can also be displaced into positions that are typically reached rarely or only briefly during the operation of the motor vehicle.

In principle, a calibration of the characteristic can be carried out exclusively during periods of time in which the internal combustion engine is not running, because the throttle valve can be displaced into any arbitrary target position during such inactive periods and deviations from an originally recorded characteristic can be determined there and the characteristic can thus be calibrated.

However it can be preferred to calibrate the characteristic both with the internal combustion engine sometimes running and with the internal combustion engine sometimes not running. If it is detected that the internal combustion engine is currently not running, the characteristic can for example be calibrated by means of a first calibration method, whereas on detecting a running internal combustion engine the characteristic can be calibrated by means of a second calibration method. The first and the second calibration methods can differ during this, in particular regarding the current position adopted by the throttle valve. The two calibration methods can however also differ, for example regarding the way in which deviations from an original characteristic are detected and corrected.

For example, in periods of time during which it is detected that the internal combustion engine is running, the characteristic can be calibrated at positions in which the throttle valve is displaced according to current driver demands. While the internal combustion engine is running, the region can be determined in which the throttle valve is predominantly displaced according to current driver demands. For example, in the case of urban journeys it can be detected that the throttle valve is mainly displaced between an almost closed and an only partly open position. During highway driving by contrast it can be detected that the throttle valve is mainly displaced between a partly open position and a wide open position.

Depending on which displacement region the throttle valve is primarily detected as adopting while the internal combustion engine is running, at a later point in time, if it is detected that the internal combustion engine is currently not running, the drive of the throttle valve can be activated such that said drive is displaced into a target position lying outside said region.

In other words, during the periods of time in which the internal combustion engine is not running it can be advantageous to displace the throttle valve specifically into those positions that were hardly reached or not reached during the preceding operation of the internal combustion engine, in order in this way to enable calibration of the characteristic at all throttle valve positions that can be adopted.

A prerequisite for the performance of the calibration with the internal combustion engine not running is that the throttle valve can be displaced specifically using the available drive acting as a positioning device. A control unit provided for performance of the calibration method should therefore also be in operation and be in a position to perform both actuation of the drive of the throttle valve and also the calibration method itself during periods of time in which the internal combustion engine is currently not running.

This can for example be implemented simply for motor vehicles that comprise a so-called start-stop system, with which, for example during a temporary stoppage of the vehicle at traffic lights, the internal combustion engine is briefly turned off to reduce fuel consumption, but the control unit continues to be active and supplied with power.

Similarly, with motor vehicles that are designed as hybrid vehicles to be driven by an auxiliary motor, for example an electric motor, when the internal combustion engine is not running, the control unit can continue to be in operation even while the internal combustion engine is not running and can thus be in a position to perform the described calibration method.

The calibration method described above can for example be carried out in a control unit for a motor vehicle. Here a programmable control unit can comprise instructions that can be read by a computer program product and that instruct said computer program product to perform the method described above. The computer program product can be stored for this on a computer-readable medium, for example in the form of a non-volatile memory.

It should be noted that possible features and advantages of embodiments of the disclosure are described herein sometimes with reference to a method for calibrating a drive of a throttle valve of an internal combustion engine and sometimes with reference to a control unit implementing such a method or a motor vehicle fitted with such a control unit. A person skilled in the art will recognize that the features can be exchanged or combined in a suitable manner to achieve further embodiments.

BRIEF DESCRIPTION OF THE DRAWINGS

Embodiments of the disclosure are described below with reference to the accompanying figures, wherein neither the figures nor the description are designed to limit the disclosure.

The figures are only schematic and not to scale.

DETAILED DESCRIPTION

Embodiments of a calibration method according to the disclosure and of a control unit implementing such a method are described below with reference to the structure shown in FIG. 1 and with reference to the flow chart shown in FIG. 2.

Figure 1:
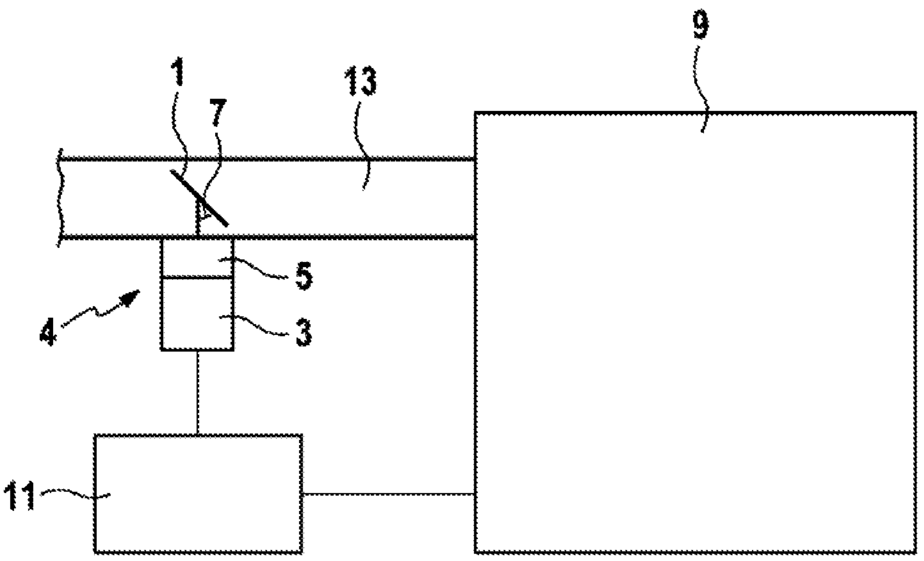
FIG. 1 shows an arrangement with a throttle valve controlled by means of a control unit, with which the method according to the disclosure can be implemented.

As shown in FIG. 1, a motor vehicle typically comprises an internal combustion engine 9 to which air is fed by means of an induction pipe 13. One or a plurality of throttle valves 1 is/are disposed in the induction pipe 13. The throttle valve 1 can be pivoted into various positions, so that it can allow more or less air to flow through the induction pipe 13. For pivoting the throttle valve 1, a throttle flap adjusting unit 4 is provided that comprises a brushless direct current motor and a gearbox 5 that serve as a drive 3.

In order to keep costs low, the electric motor does not comprise a rotor position detecting device, for example in the form of a dedicated rotor position angle transducer or a current-based angle detection means. In addition, no secondary current regulation is provided.

However, a throttle valve angle transducer 7 is provided, which can measure the position or the disposition angle of the throttle valve 1. As the throttle valve 1 is coupled by means of the gearbox 5 to the electric motor acting as the drive 3, the angle information provided by the throttle valve angle transducer 7 enables an indirect conclusion to be drawn regarding the currently prevailing position of the rotor in the electric motor, so that said information can be used after suitable processing for regulation of the drive 3.

For this purpose initially within the context of a basic adaptation a characteristic is recorded that represents the correlation between the rotor position of the electric motor and an output voltage of the throttle valve angle transducer 7. Using said characteristic, a control unit 11 can then suitably activate the drive 3 of the throttle valve positioning unit.

However, the characteristic can change with time, for example because of temperature influences or wear and tear, and therefore has to be calibrated at certain time intervals.

Figure 2:
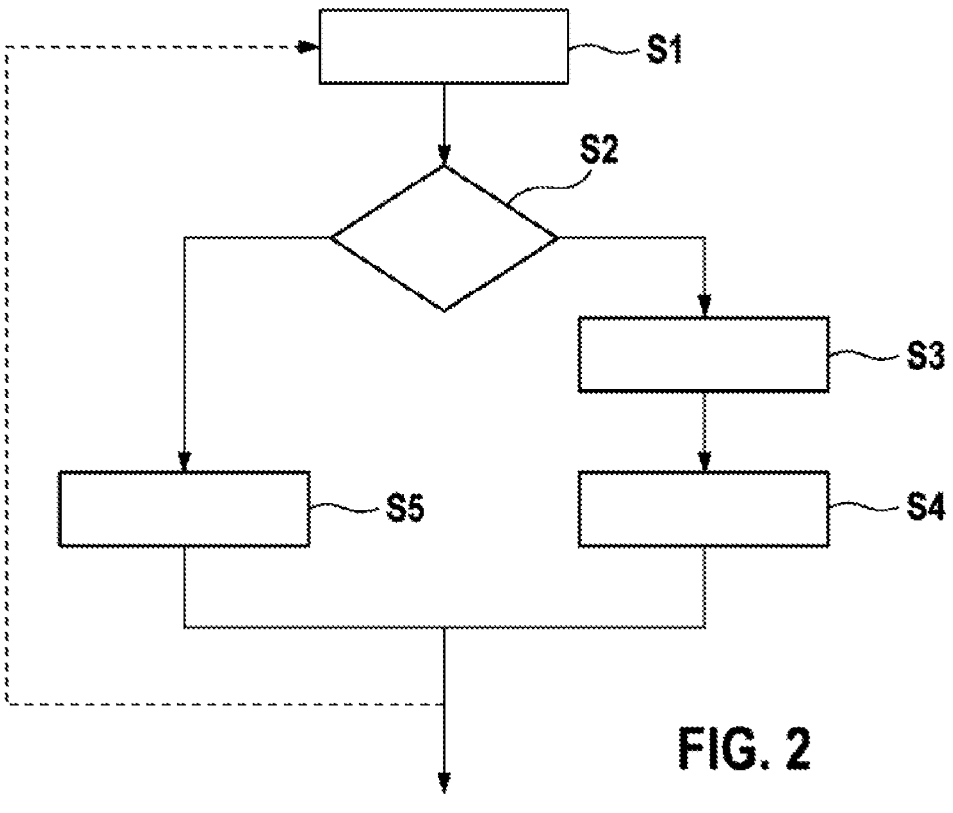
FIG. 2 shows a flow chart for illustrating a method according to the disclosure.

With reference to FIG. 2, a possible calibration method according to the disclosure is described, such as can be implemented in the control unit 11 for example.

In a first step S1 it is first detected whether the internal combustion engine 9 of the motor vehicle is currently running or is not running. Using the information obtained hereby, it is decided in a step S2 whether a first or a second calibration strategy is to be carried out.

If it is detected that the internal combustion engine 9 is currently running, the characteristic is calibrated (step S5) in a conventional manner. During this, within the context of the calibration process there is no active intervention into the global positioning of the throttle valve 1 because this can influence the operation of the internal combustion engine 9 in an undesirable manner.

Instead the throttle valve 1 is positioned by the control unit 11 according to the current driver demands, which means that the throttle valve 1 is positioned using the throttle valve positioning unit 4 such that the wish of the driver expressed by depressing the gas pedal can be met by the provision of engine power. At the correspondingly adopted positions of the throttle valve, the characteristic can then be currently calibrated, for example with conventional methods such as the pendulum method cited above. This sometimes requires a local displacement of the throttle valve about the target position that is negligibly small within certain limits and is time limited.

If however it is detected that the internal combustion engine 9 is currently not running but is inactive, for example because it has been temporarily stopped by a start-stop system or in the case of a hybrid vehicle temporarily changed to the drive by the auxiliary motor, a different calibration strategy can be carried out. Because the current positioning of the throttle valve 1 is irrelevant when the internal combustion engine 9 is not running, the throttle valve 1 can be displaced into any arbitrary target position. In particular, the current positioning of the throttle valve 1 can be selected independently of current driver demands. In the context of the second calibration strategy, the drive 3 can thus preferably be activated by the controller 11 in a step S3 such that the throttle valve 1 is displaced into a specifiable target position. Then in a step S4 the characteristic is calibrated at said target position. Because when the internal combustion engine 9 is not running the throttle valve 1 can be driven to any arbitrary target position, the characteristic can be calibrated over any arbitrary sub region.

For example, a special correction algorithm can be carried out that specifically corrects the segments of the characteristic that were corrected less frequently or not at all during the preceding operation of the motor vehicle. For example, the throttle valve 1 is typically only slightly open in urban traffic most of the time. Accordingly, only those segments of the characteristic that are associated with a small throttle valve angle are corrected according to the first calibration strategy described above with the internal combustion engine 9 running. In the event of a longer phase with the internal combustion engine not running, for example at a red traffic light, then with the internal combustion engine 9 turned off those segments of the characteristic that correspond to larger throttle valve angles can be corrected. For this, within the context of the second calibration strategy the throttle valve 1 is correspondingly wide open and the characteristic is calibrated by reading out current measurement values from the throttle valve angle transducer 7 and possibly from the electric motor of the drive 3. The characteristic is then already corrected for subsequent long-distance driving, during which the throttle valve 1 is typically wide open.

The invention claimed is:

1. A method for calibrating a drive of a throttle valve of an internal combustion engine of a motor vehicle, a rotor position of the drive and an output voltage of a throttle valve angle transducer having a characteristic correlation, the method comprising:

detecting whether the internal combustion engine is running;

in response to detecting that the internal combustion engine is running, (i) commanding the drive to displace the throttle valve into at least one first target position according to driver throttle commands, and (ii) calibrating the characteristic correlation based on the commanded at least one first target position and the corresponding output voltage of the throttle valve angle transducer; and in response to detecting that the internal combustion engine is not running, (i) commanding the drive to displace the throttle valve into at least one second target position, which is independent of driver throttle commands, and (ii) calibrating the characteristic correlation based on the commanded at least one second target position and the output voltage of the throttle valve angle transducer.

2. The method as claimed in claim 1, wherein the first target position is in a region in which the throttle valve is displaced according to current driver throttle commands.

3. The method as claimed in claim 1, wherein the second target region is outside a region in which the throttle valve is displaced according to current driver throttle commands.

4. The method as claimed in claim 1, wherein the drive of the throttle valve includes a brushless direct current motor.

5. A control unit for a motor vehicle, wherein the control unit is configured to perform a method, a rotor position of the drive and an output voltage of a throttle valve angle transducer having a characteristic correlation, the method including:

detecting whether the internal combustion engine is running;

in response to detecting that the internal combustion engine is running, (i) commanding the drive to displace the throttle valve into at least one first target position according to driver throttle commands, and (ii) calibrating the characteristic correlation based on the commanded at least one first target position and the corresponding output voltage of the throttle valve angle transducer; and in response to detecting that the internal combustion engine is not running, (i) commanding the drive to displace the throttle valve into at least one second target position, which is independent of driver throttle commands, and (ii) calibrating the characteristic correlation based on the commanded at least one second target position and the output voltage of the throttle valve angle transducer.

6. The control unit as claimed in claim 5, wherein the control unit is included in a motor vehicle.

7. The control unit as claimed in claim 6, wherein the motor vehicle comprises a start-stop system.

8. The control unit as claimed in claim 6, wherein the motor vehicle is a hybrid vehicle configured to be driven using an auxiliary motor when the internal combustion engine is not running.

9. A computer program product, comprising computer-readable instructions that instruct the computer program product when run on a programmable control unit to perform a method, a rotor position of the drive and an output voltage of a throttle valve angle transducer having a characteristic correlation, the method including:

detecting whether the internal combustion engine is running;

in response to detecting that the internal combustion engine is running, (i) commanding the drive to displace the throttle valve into at least one first target position according to driver throttle commands, and (ii) calibrating the characteristic correlation based on the commanded at least one first target position and the corresponding output voltage of the throttle valve angle transducer; and in response to detecting that the internal combustion engine is not running, (i) commanding the drive to displace the throttle valve into at least one second target position, which is independent of driver throttle commands, and (ii) calibrating the characteristic correlation based on the commanded at least one second target position and the output voltage of the throttle valve angle transducer.

10. The computer program product as claimed in claim 9, wherein the computer program product is stored on a computer-readable medium.

* * * * *